United States Patent [19]

Egigian

[11] Patent Number: 5,529,371
[45] Date of Patent: Jun. 25, 1996

[54] RAIL SAVER PAD

[76] Inventor: Donald S. Egigian, 2421 Almira Ave., Fullerton, Calif. 92631

[21] Appl. No.: 421,917

[22] Filed: Apr. 14, 1995

[51] Int. Cl.⁶ .................................................. B60P 3/32
[52] U.S. Cl. ................................... 296/164; 296/157
[58] Field of Search ............................. 296/39.2, 164, 296/167, 156

[56] References Cited

U.S. PATENT DOCUMENTS

| | | | |
|---|---|---|---|
| 3,782,775 | 1/1974 | Weiler et al. | 296/167 |
| 3,857,601 | 12/1974 | Robbins | 296/10 |
| 4,047,749 | 9/1977 | Lambitz et al. | 296/39.2 |
| 4,627,655 | 12/1986 | Collins | 296/167 |
| 4,648,649 | 3/1987 | Beal | 296/167 X |
| 4,815,787 | 3/1989 | Hale | 296/167 |
| 4,832,396 | 5/1989 | Moreno et al. | 296/164 |
| 5,052,737 | 10/1991 | Farmer, Jr. | 296/39.2 |
| 5,390,974 | 2/1995 | Theodorakakos | 296/146.9 |

*Primary Examiner*—Joseph D. Pape
*Attorney, Agent, or Firm*—G. Donald Weber, Jr.

[57] ABSTRACT

A rail saver pad comprised of a sheet or pad of resilient, waterproof material that can be easily installed on the side and front rails of a vehicle, typically a pickup truck, in order to protect the vehicle surface from wear caused by the vehicle accessory mounted thereon.

11 Claims, 1 Drawing Sheet

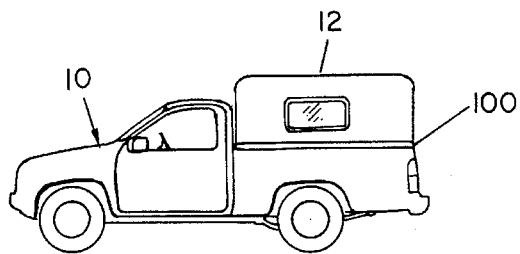
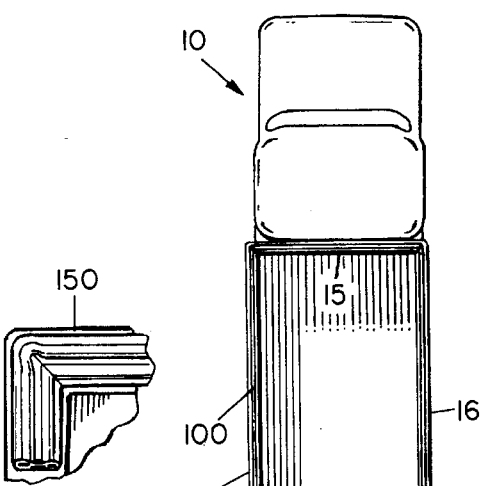
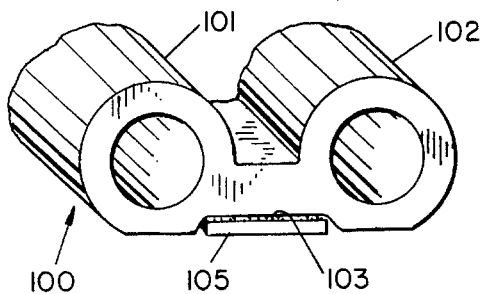
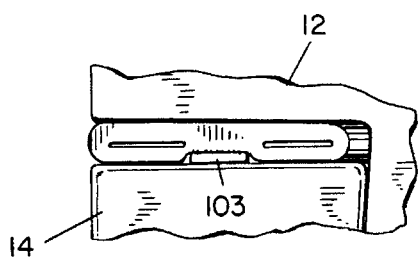
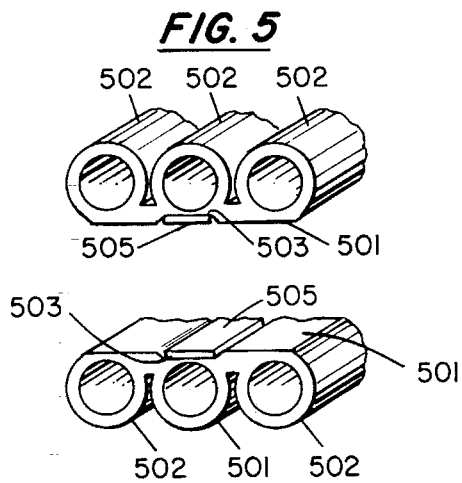
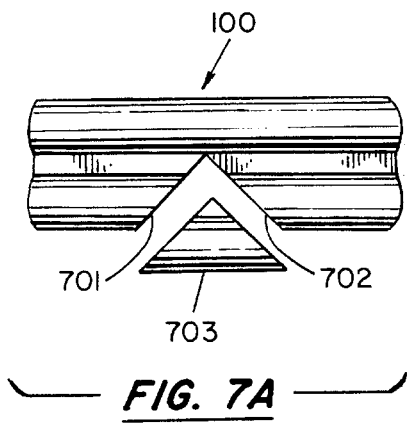
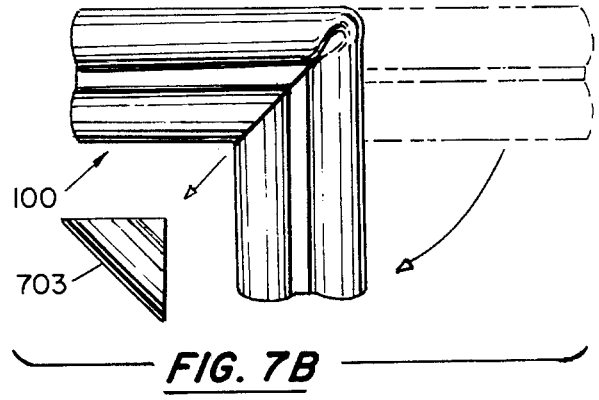

RAIL SAVER PAD

BACKGROUND

1. Field of the Invention

This invention is directed to a protective pad, in general, and to a protective pad installed between the upper surface of the side rails of a vehicle and a camper shell or the like mounted thereon, in particular.

2. Prior Art

Up until 1978, pickup truck owners were faced with the prospect that sooner or later the cargo carrying area of their vehicle would suffer significant wear and tear damage, especially paint deterioration. This damage and deterioration was largely due to the loading and unloading of cargo, as well as the shifting thereof relative to the truck bed.

Another significant problem is encountered by pickup truck owners who mount camper shells, truck caps, lumber racks or tool boxes on their trucks. These items are frequently mounted on the side rails of the trucks and/or the cargo bed. The problem of wear and tear, as well as paint deterioration is, thus, exacerbated on the side rails of the truck. This wear and tear, plus the lack of water sealing between the accessory and the truck, meant that constant maintenance was required. This is especially true with regard to repainting and the incidence of rust and related damage.

Several versions of protective liners for the cargo carrying area of a vehicle have been marketed with the goal of protecting these areas of the vehicle against wear and tear related to cargo carrying activities. These liners offered the ability to control the wear and tear on the cargo carrying areas of a vehicle.

Following the introduction of protective cargo area bedliners, it soon became clear that these liners were not, by themselves, a complete solution to the problem. Thus, a protective pad or barrier (for example PAINT SAVER) was developed for installation between the liner and the bed of the vehicle.

However, most of the liners and/or protective pads did not cover the side rails of the truck. Thus, no protection was afforded thereto. On the other hand, liners which covered the side rails were heavy, bulky, expensive, and difficult to install. Furthermore, these liners tended to shift or slide relative to the truck and to cause damage themselves. Moreover, these extended liners did not provide a true water seal between the truck side rails and the camper shell or the like. Thus, the problem of truck damage was not alleviated.

PRIOR ART STATEMENT

A patentability search, per se, was not conducted relative to this invention. Market surveys have not uncovered any similar product.

SUMMARY OF THE INSTANT INVENTION

The present invention comprises a protective pad or barrier which can be installed between the upper surface of the side rails of a vehicle, per se, and a camper shell or the like. The pad constituting the present invention utilizes a sheet of hydrophobic, i.e. water resistant, non-abrasive material that is no more than ⅝" in thickness. One or more tubes of the same material are formed on the top surface of the pad. A magnetic strip is adhered to the bottom surface of the pad.

In order for the pad to be able to withstand the continual downward pressure exerted by the camper shell, or the like, it must be capable of absorbing downward abrasive pressure without suffering structural integrity failures, as well as side-to-side shifting. Materials such as neoprene or rubber, as well as any other material exhibiting the physical characteristics herein described may be utilized.

Typically, the pad (referred to as a RAIL SAVER pad) of the present invention is installed by cutting the pad to length in order to accomodate the structural features of the vehicle side rails. The cut pad is then placed in position on the top surface of the side rails. The magnetic strip is magnetically attracted to the side rail surface to maintain the pad in place. When the camper shell (or the like) is placed in the truck, it rests on the pad and, typically, deforms (squashes) the tubes of the pad and forms a water seal between the side rail and the equipment mounted thereon. The installation procedure utilized will be dictated by the configuration of the cargo, carrying area of the vehicle. The pad can be readily removed by detaching it from the side rail without causing any damage to the side rail.

BRIEF DESCRIPTION OF THE DRAWINGS

FIG. 1 a side elevational view of a representative pickup truck and camper shell with the pad of the invention in place.

FIG. 2 is a plan view of a vehicle with the pad installed on the side rails of the cargo carrying area thereof.

FIG. 2A is an enlarged view of the portion of the pad shown in FIG. 2.

FIG. 3 is a perspective view of one embodiment of the invention.

FIG. 4 is an end view of the pad shown in FIG. 3 interposed between a truck side rail and a camper shell or the like.

FIG. 5 is a top perspective view of another embodiment of the invention.

FIG. 6 is a bottom perspective view of the pad shown in FIG. 5.

FIGS. 7A and 7B illustrate the manner of producing a continuous corner in the pad of the instant invention.

DESCRIPTION OF A PREFERRED EMBODIMENT

Referring now to FIG. 1, there is shown a schematic representation of a pickup truck 10 with a camper shell 12 mounted thereon. A protective pad 100 of this invention is interposed between the truck and the camper shell. In this illustration, vehicle 10 is a pickup truck or the like. However, other types of vehicles are contemplated.

Referring now to FIG. 2, there is shown a plan view of the truck 10 with the camper shell 12 removed. A continuous strip of the pad 100 is disposed on the top of each of the side rails 14 and 16 and front rail 15, respectively. The pad 100 is, preferably, a continuous strip to maintain a good water seal. An enlarged view of a corner 150 is shown in FIG. 2A. The pad, whether a single continuous strip or a plurality of individual strip, is, is held, magnetically, to the top surface of the side and front rails.

FIG. 2A is an enlarged view of a corner 150 of the pad 100 as shown in FIG. 2. The corner 150 is formed of a continuous portion of strip 100.

Referring now to FIG. 3, there is shown a perspective view of the pad 100 of the instant invention. The pad 100 includes a base 101 and one or more hollow tubes 102 on the top surface of the base 101. Typically, the hollow tube or tubes 102 can be integrally formed with the base 101. In one method of fabrication, the pad 100 can be extruded as a unitary device. That is, the base 101 and the tubes 102 are formed of the same material and at the same time. Of course, it is contemplated that the tubes 102 can be fabricated separately and affixed to the base by any suitable means. The specific shape, per se, of the tubes 102 is not critical. Moreover, the tubes need not be hollow. However, better operation of the pad is achieved with hollow tubes, as described infra.

As shown, a groove 103 is formed in the bottom surface of base 101. A strip 104 of magnetic material, for example, magnetic tape, is fitted into the groove 103. The strip 104 is retained in the groove by any suitable means such as an adhesive, friction fit, imbedment into the base 101 or the like.

Referring now to FIG. 4, there is shown an end view of the pad 100 interposed between a side rail 14 (or 16) and a camper shell 12 (or the like). The same effect is achieved at side rail 16 or front rail 15. In FIG. 4, the magnetic adhesive strip 103 is placed on the top surface of side rail 14 and magnetically joined thereto. This arrangement tends to keep the pad 100 in place relative to the side rail.

When the camper shell 12 (or the like) is placed on the pad 100, the tubes 102 are flattened as shown. The flattened tubes act as a buffer or protective pad relative to the top of side rail 14. Also, this pad operates as a water seal between the rail and the equipment. As noted, the hollow tubes are readily deformed. However, solid tubes could be effective, as well.

Referring now to FIG. 5, there is shown a top frontal perspective view of another embodiment of the instant invention. In this case, the base 501 has a groove 503 formed there in to receive the magnetic strip 505. Also, in this embodiment, three tubes 502 are disposed on the top surface of base 501. Typically, the tubes 502 are independently formed adjacent to each other. However, the tubes 502 can be formed together or separately and may have slightly different shapes or contours.

Referring now to FIG. 6, there is shown a bottom front perspective view of the pad 500 shown in FIG. 5. In this view, the magnetic strip 505 is readily shown. The strip 505 is mounted within groove 503 and can be adhered to the base 501 by adhesive, force fit, imbedment or the like.

Typically, the pad 100 is fabricated of a relatively thin, strong, water-repellant, rubber or neoprene material. The base 101 is, typically, about ¼" thick, 1 ½" wide, and non-abrasive. The tubes 102 are, typically, formed of the same material which is about ⅛" thick. The tubes 102 are about ½" outside diameter and about ¼" inside diameter. The magnetic strip is fabricated of ferrite-polymer blend magnetic material and is about ½" wide and about 1/16" thick. It has been determined that a pad with these dimensions can be utilized with all known commercially available truck/camper combinations without affecting the installation or effectiveness of the camper shell or truck cap.

The present invention is intended to be utilized in connection with structures mounted in the cargo carrying areas of vehicles, especially on the side rails, and the following description will describe the invention and such application.

The pad 100 is fabricated in long strips which can be rolled for convenience. It is installed by placing the pad onto the side rail of the cargo carrying area of a pickup truck and cut to the appropriate length.

Deterioration of painted surfaces of the cargo carrying area due to the effect of abrasive contact between the camper shell and the painted surface can lead to abnormal wear and tear related damage to the vehicle. Water leakage between the camper shell and the truck rail can also produce damage to the truck. As a result of these concerns, a strong need has developed for a product that can prevent deterioration to a vehicle when a camper shell is installed in the cargo carrying areas of a vehicle.

Typically, pad 100 is stored in a coiled configuration prior to being unrolled to the desired dimension of the vehicle's cargo carrying area. The pad once uncoiled or laid out flat can then be cut to match the features of the vehicle's cargo carrying area by making the appropriate cuts or shaping where needed, as noted above. Once the pad 100 is cut to the desired dimension and configuration, it can be installed on the pickup truck's cargo side rails by use of the magnetic strips.

Referring now to FIGS. 7A and 7B, there is illustrated a preferred method of making the corner 150 shown in FIG. 2A. In FIG. 7A, a portion of the pad 100 is shown. A pair of miter cuts 701 and 702 of 45° is made approximately half way through the width of the pad. The cutout section 703 is discarded. The pad is then folded or bent to bring the miter cuts into abutment. This creates an effective corner seal as shown in FIG. 7B.

In accordance with this invention, the camper shell is installed directly upon the pad 100 whereby the undersurface of the truck attachment is cushioned and prevented from coming into contact with the painted surface of the side rail surrounding the cargo carrying area of the vehicle. Thus, the painted surface will be protected from the abrasive action or grinding. As a result, when the camper shell is removed or replaced, the painted surface of the cargo carrying area will not reflect the wear and tear it would otherwise experience if the area was not protected by the pad of this invention. Moreover, the pad provides a watertight seal between the side rail of the truck and the camper shell or similar accessory mounted on the truck.

Thus, there is shown and described a unique design and concept of a rail saver pad. The particular configuration shown and described herein relates to a rail saver pad designed for use on the side and front rails of the cargo carrying area of a vehicle. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A pad for the protection of the side and front rails of a vehicle cargo area comprising, a sheet of resilient, water resistant material, said sheet is made of a non-abrasive, hydrophobic material capable of absorbing shocks and pressures applied thereto without structural breakdown which would result in deterioration of the integrity of a painted surface of the vehicle cargo area in which said sheet is mounted, at least one resilient section formed on said sheet and adapted to cushion and absorb shocks and downward pressures on said sheet, and a magnetic strip fixed to said sheet for fastening said sheet to the side rails of a vehicle cargo area, said sheet having first and second surfaces, said section and said magnetic strip disposed on opposite surfaces of said sheet.

2. The pad of claim 1 in which, said sheet is made of a neoprene material.

3. The pad of claim 1 wherein, said sheet is about ¼" in thickness.

4. The pad of claim 1 wherein, said sheet is capable of being installed under any accessory mounted on the side rails of a vehicle cargo carrying area without interfering with the installation or functional efficiency of said accessory.

5. A protective device for use with a vehicle adapted to carry an accessory such as a camper shell which rests on the side rails of the vehicle comprising, a pad of resilient, hydrophobic material, said pad configured to conform generally to the top surface of the side rails of a vehicle which is adapted to carry an accessory, at least one resilient component mounted on a first surface of said pad, and fastener means included in a second surface of said pad adapted to retain said pad in position on the top surface of said side rails of said vehicle.

6. The pad recited in claim 5 wherein, said resilient component comprises an elongated cylinder formed of the same material as said pad.

7. The pad recited in claim 6 wherein, said cylinder is a hollow tube.

8. The pad recited in claim 5 wherein, said fastener means comprises a flexible magnetic strip.

9. The pad recited in claim 5 wherein, said resilient component comprises a plurality of hollow cylinders disposed adjacent to each other.

10. The pad recited in claim 8 wherein, said second surface includes a channel formed therein to receive said flexible magnetic strip.

11. The pad recited in claim 5 wherein, said fastener means is substantially co-planar with said second surface.

\* \* \* \* \*